United States Patent
Bheda et al.

(10) Patent No.: US 10,364,341 B2
(45) Date of Patent: Jul. 30, 2019

(54) METHOD AND APPARATUS FOR 3D PRINTING OF NANO-FILLER/POLYMER COMPOSITES

(71) Applicant: Arevo, Inc., Saratoga, CA (US)

(72) Inventors: Hemant Bheda, Saratoga, CA (US); Riley Reese, Sunnyvale, CA (US)

(73) Assignee: Arevo, Inc., Milpitas, CA (US)

( * ) Notice: Subject to any disclaimer, the term of this patent is extended or adjusted under 35 U.S.C. 154(b) by 511 days.

(21) Appl. No.: 15/094,967

(22) Filed: Apr. 8, 2016

(65) Prior Publication Data

US 2016/0297142 A1 Oct. 13, 2016

Related U.S. Application Data

(60) Provisional application No. 62/155,916, filed on May 1, 2015, provisional application No. 62/144,417, filed on Apr. 8, 2015.

(51) Int. Cl.

| | |
|---|---|
| *B29C 67/00* | (2017.01) |
| *B33Y 30/00* | (2015.01) |
| *B33Y 50/02* | (2015.01) |
| *B33Y 70/00* | (2015.01) |
| *B33Y 10/00* | (2015.01) |
| *C08K 7/24* | (2006.01) |
| *C09D 11/037* | (2014.01) |
| *C09D 11/102* | (2014.01) |

(Continued)

(52) U.S. Cl.
CPC .............. *C08K 7/24* (2013.01); *B29C 64/135* (2017.08); *B33Y 70/00* (2014.12); *C08K 3/04* (2013.01); *C09D 11/037* (2013.01); *C09D 11/102* (2013.01); *C09D 11/324* (2013.01); *B29K 2071/00* (2013.01); *B29K 2105/162* (2013.01); *B33Y 10/00* (2014.12); *C08K 3/041* (2017.05)

(58) Field of Classification Search
CPC .. C08K 7/24; C08K 3/04; C08K 3/041; B29C 64/135; C09D 11/324; C09D 11/037; C09D 11/102; B33Y 70/00; B33Y 10/00; B29K 2105/162; B29K 2071/00
See application file for complete search history.

(56) References Cited

U.S. PATENT DOCUMENTS

| | | | |
|---|---|---|---|
| 2004/0115344 A1* | 6/2004 | Newsome | B41J 3/407 427/162 |
| 2006/0035034 A1* | 2/2006 | Matsumoto | B42D 25/29 427/487 |

(Continued)

*Primary Examiner* — Nahida Sultana

(74) *Attorney, Agent, or Firm* — Wayne S Breyer; Robert P Marley

(57) ABSTRACT

An apparatus and method for printing an object via additive manufacturing is disclosed. In accordance with an illustrative embodiment, one or more inks are prepared, including a thermo-polymer ink, a nano-filler ink, and a thermo-polymer/nano-filler ink. In some embodiments, an object is printed by depositing alternating layers of thermo-polymer ink and nano-filler ink and exposing the layers to microwave radiation. In some other embodiments, an object is printed by depositing alternating layers of thermo-polymer/nano-filler ink and nano-filler ink and exposing the layers to microwave radiation. In some additional embodiments, an object is printed by depositing successive layers of thermo-polymer/nano-filler ink and exposing them to microwave radiation.

13 Claims, 3 Drawing Sheets

(51) Int. Cl.
  *C08K 3/04* (2006.01)
  *C09D 11/324* (2014.01)
  *B29C 64/135* (2017.01)
  *B29K 71/00* (2006.01)
  *B29K 105/16* (2006.01)

(56) References Cited

U.S. PATENT DOCUMENTS

| | | | | |
|---|---|---|---|---|
| 2009/0139574 A1* | 6/2009 | Pickett | ............... | B82Y 30/00 136/265 |
| 2009/0309905 A1* | 12/2009 | Yoshioka | ............... | B41J 3/28 347/8 |
| 2010/0122642 A1* | 5/2010 | Farrugia | ............... | C09D 11/101 106/31.29 |
| 2013/0074718 A1* | 3/2013 | Gal | ............... | B41C 1/05 101/395 |
| 2013/0193619 A1* | 8/2013 | Church | ............... | B29C 67/0081 264/400 |
| 2014/0235759 A1* | 8/2014 | Baker | ............... | B32B 5/24 523/440 |
| 2014/0275317 A1* | 9/2014 | Moussa | ............... | C09D 133/08 522/72 |
| 2014/0306164 A1* | 10/2014 | Restuccia | ............... | C08K 3/04 252/511 |
| 2014/0308531 A1* | 10/2014 | Miao | ............... | C09D 11/02 428/471 |
| 2014/0326917 A1* | 11/2014 | Srivastava | ............... | C09D 11/52 252/76 |
| 2015/0061190 A1* | 3/2015 | Yakubov | ............... | B33Y 10/00 264/401 |
| 2015/0175820 A1* | 6/2015 | Breton | ............... | C08K 5/053 347/20 |
| 2015/0314534 A1* | 11/2015 | Yakubov | ............... | B33Y 10/00 264/401 |
| 2015/0343673 A1* | 12/2015 | Williams | ............... | B29C 39/026 264/1.37 |
| 2015/0360418 A1* | 12/2015 | Shah | ............... | B29C 67/0081 264/489 |
| 2016/0200011 A1* | 7/2016 | Rothfuss | ............... | B29C 35/12 428/412 |
| 2017/0015065 A1* | 1/2017 | Potter | ............... | B29C 70/62 |
| 2017/0028632 A1* | 2/2017 | Cox | ............... | B29C 67/0077 |
| 2017/0121178 A1* | 5/2017 | Shigeta | ............... | C08J 3/16 |
| 2017/0266993 A1* | 9/2017 | Ohnishi | ............... | D06P 1/52 |
| 2017/0297334 A1* | 10/2017 | De Meutter | ............... | B41J 2/14 |
| 2017/0362449 A1* | 12/2017 | Malic | ............... | B41M 3/14 |
| 2018/0022950 A1* | 1/2018 | Weber | ............... | C09D 11/38 523/218 |
| 2018/0147777 A1* | 5/2018 | Abbott, Jr. | ............... | B33Y 70/00 |
| 2019/0002719 A1* | 1/2019 | Pousthomis | ............... | B01J 13/043 |
| 2019/0160532 * | 5/2019 | Erickson | ............... | B22F 3/008 |

* cited by examiner

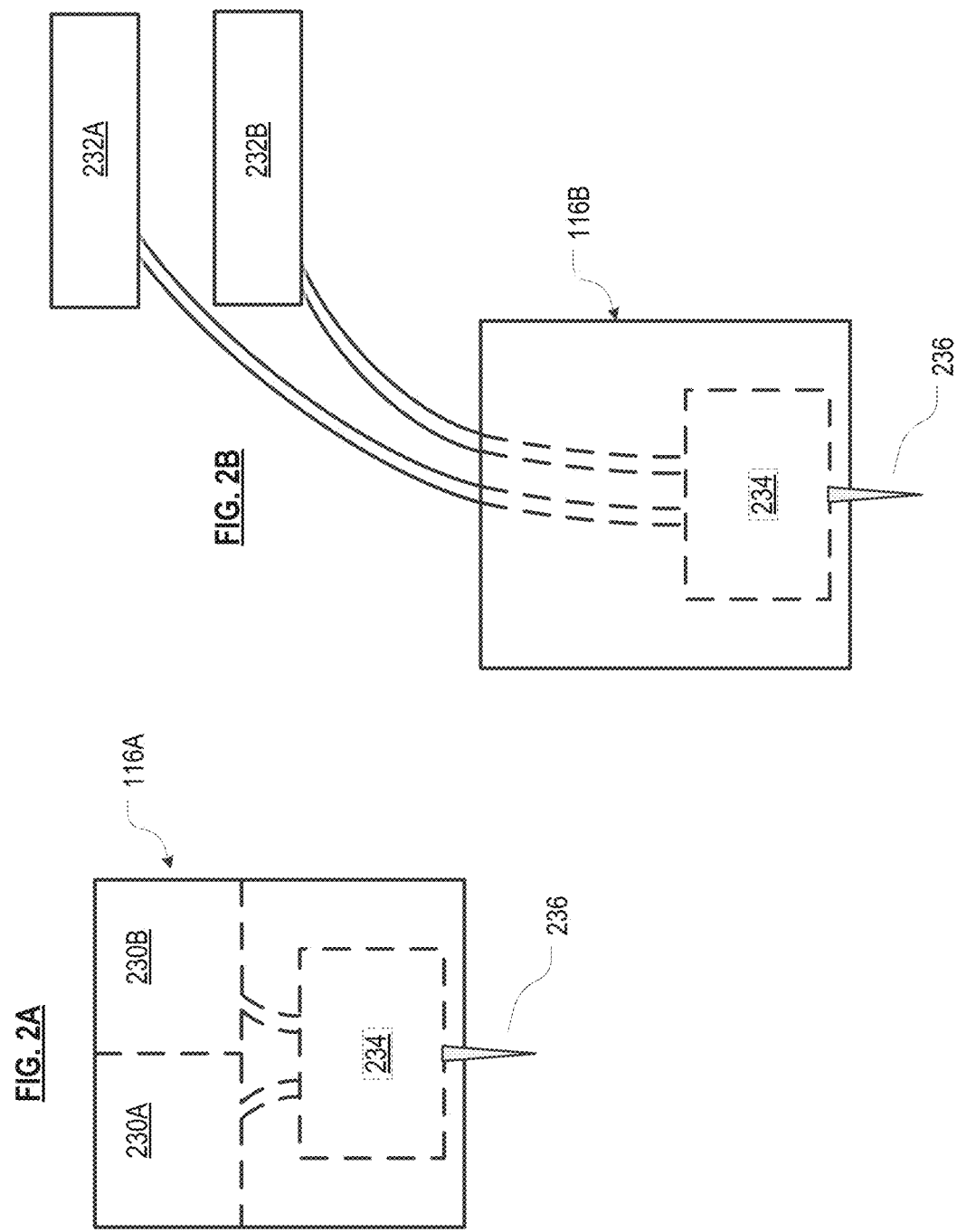

METHOD AND APPARATUS FOR 3D PRINTING OF NANO-FILLER/POLYMER COMPOSITES

STATEMENT OF RELATED CASES

This case claims priority of U.S. Patent Application Ser. No. 62/144,417 filed Apr. 8, 2015 and Ser. No. 62/155,916 filed May 1, 2015, both of which applications are incorporated by reference herein.

FIELD OF THE INVENTION

The present invention relates generally to additive manufacturing (or 3D printing) of composite structures.

BACKGROUND OF THE INVENTION

The additive manufacturing process is widely known as "3D printing." Numerous 3D-printing methodologies have been described in prior art, the most common being selective-laser sintering (SLS), stereolithography (SLA), and extrusion-based 3D printing or fused filament fabrication (FFF).

In FFF, a 3D object is produced, in accordance with a mathematical model thereof, by extruding a succession of small, flattened strands of molten material that harden as soon as they leave the extrusion nozzle. The object is built from the bottom up, one layer at a time.

In SLS, a laser selectively fuses powdered material by scanning, on the surface of a powder bed, cross-sections generated from a 3-D digital description of the object. After scanning a cross-section, the powder bed is lowered by one layer thickness, a new layer of material is applied on top, and the process is repeated until the object is completed.

In stereolithography, an ultraviolet (UV) laser is directed toward a vat of photopolymer resin. Using computer aided design software (CAM/CAD), the UV laser draws a design or shape on the surface of the photopolymer vat. Due to its photosensitivity to UV light, the resin solidifies and forms a single layer of the nascent 3D object. This process is repeated for each layer of the design until the 3D object is complete.

Although suitable for prototyping, most 3D printed objects are typically not robust enough to be used as structural parts, such as for use in automotive, aerospace, medical or other aggressive-use applications. This is the case regardless of the methodology (FFF, SLS, SLA) used.

The excellent mechanical properties of carbon nanotubes ("CNTs") and graphene suggest that incorporation of a very small amount of either of these materials into a polymer matrix can lead to structural materials having exceedingly high durability and high strength as well as low weight. To date, however, the production of high-strength CNT polymer composites has proven to be rather difficult; CNT-infused polymers produced thus far show some improvement in strength, but far below expectations.

Research has indicated that poor adhesion between the polymer and CNT is the limiting factor for imparting the mechanical properties of CNTs to polymer composites. Moreover, van der Waals interactions cause CNTs to form stabilized bundles, making them very difficult to disperse and align in a polymer matrix.

Researchers have focused on ways to effectively disperse CNTs into a polymer matrix. Thus far, techniques that have found at least some success for dispersing CNTs in the polymer matrix include: solution mixing, melt mixing, electrospinning, in-situ polymerization, and chemical functionalization of the CNTs.

Although 3D-printed objects have been made using CNT/polymer composites, the resulting parts do not demonstrate any significant enhancement in mechanical properties (c.a., no more than about a three-fold increase, which in the context of CNTs for example, is negligible compared to the potential). Rather, CNT/polymer-composite printed objects are currently being used for their electrical properties, such as to control electrostatic discharge.

SUMMARY

The present invention provides apparatus, method, and compositions for printing objects using thermo-polymer and CNT or other nanomaterials, which avoids the shortcomings of the prior art.

In accordance with embodiments of the invention, 3D objects comprising a thermo-polymer/nanomaterial material are printed via from specially prepared "inks." In one embodiment, a 3D object is printed from (i) a thermo-polymer ink and (ii) a nano-filler (CNTs or other nano-scale material) ink. In a second embodiment, a 3D object is printed from a thermo-polymer/nano-filler ink. In a third embodiment, a 3D object is printed from (i) a thermo-polymer/nano-filler ink and (ii) a nano-filler ink.

Unlike the approaches of the prior art, wherein various techniques have been used to improve the dispersion of nanomaterial in polymer, applicant has avoided suspending nanomaterial in the polymer. Rather, the nanomaterial is suspended in a liquid solution, therefore ensuring wetting and dispersion. This has enabled applicant to produce compositions with much higher concentrations of nanomaterial in thermo-polymer than the prior art.

The aforementioned inks are dispensed under pressure layer-by-layer in accordance with build instructions. In some embodiments, an object is printed via alternating layers of thermo-polymer ink and nano-filler ink. In some other embodiments, an object is printed via successive layers of a thermo-polymer/nano-filler composite ink. And in yet further embodiments, an object is printed via alternating layers thermo-polymer/nano-filler composite ink and nano-filler ink.

In a departure from the prior art, rather than simply using laser light or UV, embodiments of the invention utilize microwave radiation. The use of microwave radiation physically moves some types of nano-filler, such as CNTs, back and forth, which heats up and (indirectly) melts nearby thermo-polymer. Neither UV nor laser light can do this.

Compared to the prior art, the use of microwave radiation alone (or in combination with a laser) results in:

Faster deposition speeds. Global, rapid heating and melting of high-temperature thermoplastics is not possible via SLS or SLA techniques.

Better printed-object material properties. Microwave radiation penetrates deeper than UV enabling better adhesion between layers and rasters through the printed object compared to SLS or SLA techniques. Furthermore, microwave radiation has been shown to remove defects within CNTs thereby increasing strength.

Improved surface finish. Elimination of z-layer appearance through surface-targeted microwave radiation at relatively low power.

Higher crystallinity. Tighter control is possible over the melting and fusing of polymer nanoparticles with controlled microwave radiation as compared to UV or laser. Relatively low power microwave radiation can be used during or after the build to anneal the object and reduce the presence of voids/defects, which would otherwise compromise materials properties.

In some embodiment, the invention provides a method for printing an object via additive manufacturing, wherein the process comprises:

depositing a first layer, the first layer comprising droplets of a first ink, wherein the first ink comprises thermo-polymer particles in a first suspension medium;

depositing a second layer on at least a portion of the first layer, wherein the second layer comprises droplets of a second ink, wherein the second ink comprises first nano-filler in a second suspension medium;

depositing a third layer on at least a portion of the second layer, wherein the third layer comprises droplets of the first ink; and exposing the first, second and third layers to microwave radiation.

In some embodiments, the invention provides an apparatus for printing an object via additive manufacturing, the apparatus comprising:

a print head having at least one nozzle, wherein the print head dispenses at least one of:
  (i) a first ink comprising a thermo-polymer in a suspension medium, and
  (ii) a second ink comprising a nano-filler in a suspension medium;

a gantry, wherein the print head is movably coupled to the gantry to enable the print head to move in at least one direction;

a source of microwave radiation; and a build platform, wherein the at least first ink or second ink is dispensed from the print head to the build platform, and wherein the build platform is movable in a vertical direction.

BRIEF DESCRIPTION OF THE FIGURES

FIG. 2A depicts a first embodiment of a print head for use in conjunction with the 3D printer of FIG. 1.

FIG. 2B depicts a second embodiment of a print head for use in conjunction with the 3D printer of FIG. 1.

DESCRIPTION

The present invention provides a way to produce printed parts or other objects (hereinafter collectively "objects") from a composite material comprising: (i) polymer and (ii) "nano-filler," such as CNT and/or other nano-scale materials. Unlike printed objects formed from CNT/polymer composites using prior-art techniques, those formed in accordance with the present teachings exhibit substantially enhanced mechanical properties.

Figure 1:
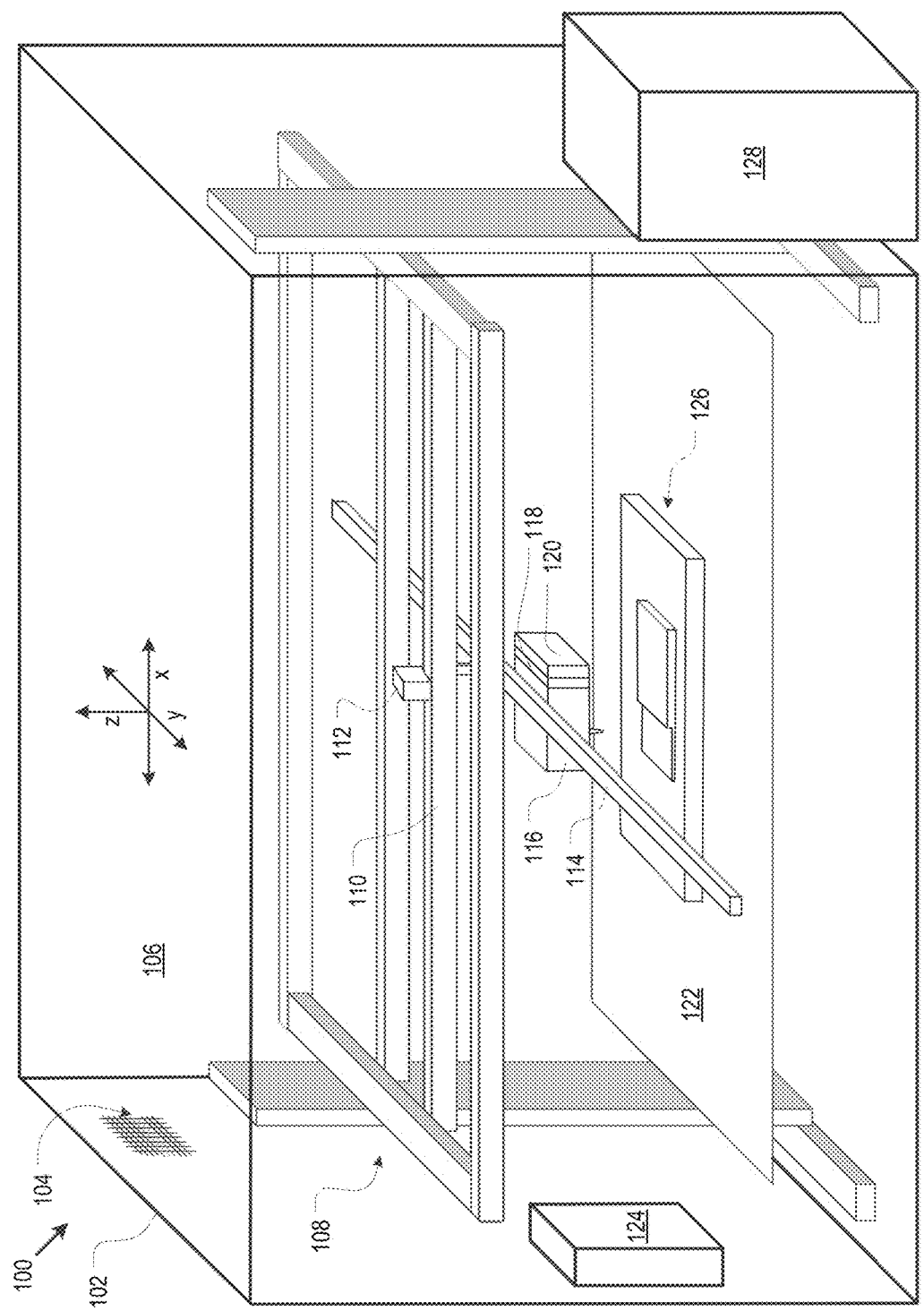
FIG. 1 depicts a 3D printer in accordance with an illustrative embodiment of the present invention.

FIG. 1 depicts 3D printer 100 for use in printing objects from a nano-filler/polymer composite, in accordance with an illustrative embodiment of the present invention. 3D printer 100 is capable of printing objects from a nano-filler/polymer composite via either (i) a selective laser sintering methodology, (ii) a modification thereof that uses microwaves, or (iii) a methodology unlike any existing process using microwaves.

3D printer 100 includes housing or enclosure 102, gantry system 108, print head 116, focused heat sources 118 and 120, build platform 122, and computer/controller 128.

Housing 102 defines build chamber 106. Housing 102 provides an environmentally controlled environment; during printing, build chamber 106 is under an inert-gas atmosphere (e.g., nitrogen, argon, helium, etc.). The temperature in build chamber 106 rises during the build (since heat is being input to the system via focused heat sources 118 and 120 and not being removed). This is beneficial since the elevated temperature reduces warping of the printed object. Temperature in build chamber starts out near room temperature and can rise to as much as about 280° C. The inert-gas atmosphere in build chamber 106 also prevents the inclusion of debris or other foreign particles into the object being produced. In some embodiments, housing 102 includes microwave radiation (Faraday) shielding 104.

In the illustrative embodiment, notional gantry system 108 enables print head 116 and coupled focused heat sources 118 and 120 to move in the X and Y directions. Gantry 108 includes rail(s) 110, arm 112, and rail 114. Rail(s) 110 are oriented in the X direction (left/right in FIG. 1) and rail 114 is oriented in the Y direction (front/back in FIG. 1). Arm 112 movably couples to rail(s) 110 and supports rail 114. Print head 116 movably couples to rail 114. Movement of arm 112 along rail 110 and movement of print head 116 along rail 114 is computer controlled (drive systems not depicted).

Print head 116 deposits material on build platform 122 to sequentially build object 126. Build platform 122 is heated and is movable in the Z direction (up/down in FIG. 1), such that 3D printer 100 provides 3 degrees-of-freedom for building object 126.

3D printer 100 also includes controller 128. The controller reads and executes build instructions generated by an outboard computer (not depicted) based on a 3D model of the object that is to be printed (i.e., object 126). For example, controller 128 orchestrates the build by controlling movements of print head 116, the rate at which material is deposited on to build platform 122, and the operation of focused heat sources 118 and/or 120.

FIGS. 2A and 2B depict embodiments of print head 116. The print head is somewhat analogous to an "ink-jet" print head.

FIG. 2A depicts print head 116A, which includes two internal "ink" reservoirs 230A and 230B, ultrasonic dispersion system 234, and nozzle 236. FIG. 2B depicts print head 116B which does not include internal reservoirs; rather ultrasonic dispersion system 234 in this embodiment is fed by external reservoirs 232A and 232B.

As discussed in further detail below, during printing, one of the reservoirs contains a thermo-polymer/nano-filler composite ink and the other reservoir contains a nano-filler ink. In some other embodiments, one of the reservoirs contains a thermo-polymer ink and the other reservoir contains a nano-filler ink. And in yet some further embodiments, both reservoirs contain a thermo-polymer/nano-filler composite ink. In the latter embodiment wherein only a thermo-polymer/nano-filler composite ink is used for printing, print head 116A can contain a single reservoir and print head 116B can be fed by a single reservoir.

The reservoirs 230A/230B or 232A/232B feed ultrasonic dispersion system 234. The ultrasonic dispersion system, well known to those skilled in the art, is capable of dispersing the particles of thermo-polymer and/or nano-filler within the suspension medium of the ink (e.g., water, methanol, etc., as discussed further below). Ultrasonic dispersion system 234 and nozzle 236 are commercially available (as an integrated unit) from Sono-Tek of Milton, N.Y. and others.

After ultrasonic dispersion, the ink(s) are expelled from nozzle 236 under pressure and deposited, layer-by-layer, as directed by controller 128 in accordance with the build instructions. Further description of the build process is provided later in this specification.

With continued reference to FIG. 1, in the illustrative embodiment, focused heat source 118 and focused heat source 120 are coupled to print head 116. In the illustrative embodiment, focused heat source 118 is a laser (hereinafter "laser 118") and focused heat source 120 is a maser (hereinafter "maser 120").

In some other embodiments, only a single focused heat source, either a laser or a maser, is present. As discussed further below, in some embodiments, sources 118 and/or 120 apply heat to the ink immediately after it is deposited (and only to that ink). In some embodiments, non-focused microwave generator 124, which applies microwave radiation at a relatively lower power than laser 118 or maser 120, provides an unfocused application of heat to all material that has been deposited on build platform 122. In various embodiments, focused heat sources 118 and/or 120 are used with or without microwave generator 124. In yet a further embodiment, microwave generator 124 is used without focused heat sources 118 and/or 120.

In the embodiment depicted in FIG. 1, a single print head 116 is used and laser 118 and maser 120 are affixed thereto such that the print head and the focused heat sources move in concert. However, a variety of other arrangements are contemplated:

(i) Print head 116 with only laser 118 affixed thereto; maser 120 supported separately by a fixture for movement independently of print head 116/laser 118;
(ii) Print head 116 with only maser 120 affixed thereto; laser 118 supported separately by a fixture for movement independently of print head 116/maser 120;
(iii) Print head 116 supported by itself; laser 118 and/or maser 120 supported separately by a fixture for movement independently of print head 116;
(iv) Multiple print heads 116 each with laser 118 and/or maser 120 attached and each print head supported by its own arm for movement independently of the other print heads; and
(v) Versions of (i) through (iii) wherein there are multiple print heads 116 and multiple focused heat sources supported separately therefrom.

In yet some further embodiments, print head 116 includes a sufficient number of nozzles arrayed in a 1D array in the Y direction, for example, such that the print head only moves in the X direction, wherein not all of the nozzles are necessarily printing at the same time. Of course, the nozzles could be array in the X direction such that the print head only moves in the Y direction. In still further embodiments, the 1D array of nozzles is not sufficient to cover the full print range in the direction of the array such that there is some limited movement in the direction of array of nozzles. In yet some additional embodiments, there are multiple nozzles in a single print head, wherein the nozzles are arrayed in a 2D array.

Ink Composition.

One ink comprises a mixture of thermo-polymer particles, at least one nano-filler, and a suspension medium. A second ink comprises thermo-polymer particles and a suspension medium. A third ink comprises nano-filler, a suspension medium, and optionally a surfactant.

An important distinction between embodiments of the invention and the prior art is that unlike the prior art, in the inventive ink compositions, the nano-filler is not simply mixed or compounded in the polymer. Rather, nano-filler, whether alone in a nano-filler ink or as a composite in the thermo-polymer/nano-filler ink, is suspended in a liquid solution. This ensures wetting and dispersion, which is believed to be critical to realizing the promise of polymer/nano-filler composite materials.

The polymer, which is typically a thermoplastic resin, is present in the ink as particles having a size that is preferably in the range of about 2 to 5 microns. Suitable thermoplastic resins include, without limitation, polyaryletherketone (PAEK), polyethertherketone (PEEK), polyetherketoneketone (PEKK), polyethylene (PE), polyetherimide (PEI commonly known as Ultem), polyethersullone (PES), polysullone (PSU), polyphenylsullone (PPSU), polyphc-mylenc-3 oxides (PPOs), acrylonitrile butadiene styrene (ABS), polylactic acid (PLA), polyglycolic acid (PGA), polyamide-imide. (PAI), polystyrene (PS), polyamide (PA), polybutylene terephthalate (PBT), poly(p-phenylene sulfide) (PPS), polyethersulfone (PESU), polyphenylene ether (commonly known as PrimoSpire), and polycarbonate (PC). These thermoplastic resins are readily commercially available from companies such as Solvay Plastics or others.

Suitable nanofiller(s) include (and term "nano-filler" is defined for use in this disclosure and the appended claims to mean), without limitation, CNTs, graphene, graphene nano-platlets, graphene nano-ribbons, metallic nanoparticles, aramid nanofibers, carbon nanofibers, and the like. The metallic nanoparticles may include, but are not limited to, nanometer-size particles of silver, copper, steel, gold, or the like. These metallic nanoparticles are added for enhanced thermal/electrical conductivity (not mechanical strength).

CNTs can include all types of multi-wall or single-wall CNTs as well as CNT-polymer encapsulated flakes. The diameter of the CNTs can range from about 0.1 nanometer (nm) to 50 nm and the lengths can range from 1 nm to about 10 millimeters (mm).

Suitable suspension materials include, without limitation, distilled water, an alcohol-based solvent (methanol, ethanol, etc.) methyl acetate, tetrahydrofuran, 2-dichlorobenzene (DCB), acetone, chloroform, N-methyl-pyrrolidone (NMP), dimethylformamide (DMF), or any other solvent used to stabilize nanoparticles or thermoplastic resins in solution.

Surfactants suitable for use in conjunction with the preparation of inks include sodium dodecylbenzene, and other ionic surfactants including, without limitation, sodium dodecylsulfate (SDS), sodium cholate (SC), and sodium deoxycholate (SDOC).

Example—Preparation of Thermo-Polymer Ink

In this example, PEEK is used as the thermo-polymer. PEEK ink is prepared by mixing PEEK/carbon black in water. The carbon black enhances the near infrared absorption for laser heating and sintering. The number average molecular weight of the PEEK can be in a range from about 40,000 to about 60,000 and the weight average molecular weight of the PEEK can be in a range from about 90,000 to about 110,000. Carbon black concentration can be in a range from about 0.1 to about 10 weight percent of PEEK/carbon black mixture.

For this example, PEEK with a number average molecular weight of 50,200 and a weight average molecular weight of 105,800 and carbon black (at 1 weight percent of the PEEK/carbon black mixture) is compounded using a twin extruder with a high-shear screw. The PEEK/carbon black pellets were then powderized to produce an ultra-fine powder with a mean particle size of D50 and a mean diameter of 10 microns. Typically, particle size distribution will range from D10 to about D100 with diameters in the range of about 1 micron to about 100 microns.

The powder was added to 1 L of water at 50 weight percent loading. The concentration of the powder in the ink is typically in the range of about 10 to 99 percent by weight. The mixture was energetically agitated at room temperature (25° C.) using directed low frequency, high power ultrasonication at 700 W and 20 kHz for 24 hours. Ultrasonic mixing can be conducted at power in the range of about 100 W to 1000 W and 1 kHz to 100 gHz. The time needed can range from about 0.5 to about 48 hours. "Liquid Mixer" brand ultrasonic mixer commercially available from Aurizon Ultrasonics, LLC of Kimberly, Wis. and "Q1700 Sonicator" brand ultrasonic mixer commercially available from Hielscher USA, Inc. of Ringwood, N.J. may suitably be used for ultrasonic mixing.

After mixing, the thermo-polymer ink is ready to be poured into a reservoir for the print head.

Example—Preparation of Nano Filler Ink

In this example, CNT is used as the nano-filler. CNT ink was prepared by mixing CNT and a surfactant with methanol. The CNT was a multi-wall, long aspect ratio CNT with a diameter of 10 nm and a length of 50 nm.

The CNT was added to 1 L of methanol at 50 weight percent loading. The weight loading can be in a range of about 0.5 weight percent to about 80 weight percent. The surfactant sodium dodecylbenzene is added at 1 weight percent of the CNT/methanol mixture to enhance dispersion and prevent agglomeration of CNT.

The mixture was then energetically agitated at room temperature using directed low power, high frequency ultrasonication at 12 W and 55 kHz for 24 hours. The Q700 Sonicator and Q500 Sonicator brands of ultrasonic mixer, commercially available from Hielscher USA, Inc. of Ringwood, N.J., may be used for this purpose.

After mixing, the nano-filler ink is ready to be poured into a reservoir for the print head.

Example—Preparation of Thermo-Polymer/Nano-Filler Ink

In this example, PEEK is used as the thermo-polymer and CNT is used as the nano-filler. The PEEK/CNT ink is prepared by mixing PEEK/CNT with water. The PEEK and CNT are characterized as for above examples.

The PEEK/CNT was compounded using a twin extruder with a high-shear screw at 3 weight percent CNT in the PEEK/CNT mixture. The PEEK/CNT pellets are then powderized and the ink is produced as discussed above for the production of PEEK ink.

After mixing, the thermo-polymer/nano-filler ink is ready to be poured into a reservoir for the print head.

Figure 3A:
FIG. 3A depicts a first layer structure, printed by the 3D printer of FIG. 1, for printing nano-filler/polymer composite parts in accordance with an embodiment of the invention.
Figure 3B:
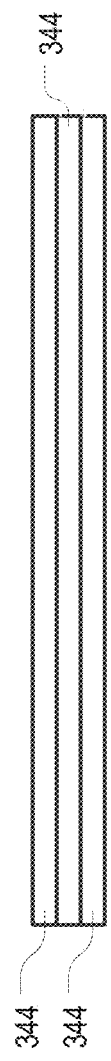
FIG. 3B depicts a second layer structure, printed by the 3D printer of FIG. 1, for printing nano-filler/polymer composite parts in accordance with an embodiment of the invention.

FIGS. 3A through 3B depict three different "layering" approaches for printing an object using thermo-polymer and nano-filler.

In the embodiment depicted in FIG. 3A, an object is printed via alternating layers of thermo-polymer ink and nano-filler ink. That is, a first layer 340 of thermo-polymer ink is deposited, then a second layer of nano-filler ink 342 is deposited thereon, followed by a third layer 340 of thermo-polymer ink, etc.

In the embodiment depicted in FIG. 3B, an object is printed via successive layers 344 of thermo-polymer/nano-filler ink. And in the embodiment depicted in FIG. 3C, an object is printed via alternating layers thermo-polymer/nano-filler ink 344 and layers of nano-filler ink 342.

Example—Printing an Object

Inks are prepared as discussed above and added to the internal (230A, 230B) or external (232A, 232B) reservoirs, depending on the embodiment. Print head 116 is pressurized for expelling the ink(s). Pressure will typically be in a range of 100 psi to 10,000 psi, using gas or liquid. In an exemplary embodiment, print head 116 is pressurized with argon to 2000 psi.

Prior to expulsion from nozzle 236, the ink(s) are ultrasonically dispersed. For use in conjunction with embodiments of the invention, the dispersion system will operate at a power in a range of 50 watts to 1000 watts and at a frequency that is typically in a range of 1 kHz to 100 gHz. In an exemplary embodiment, the ultrasonic dispersion system operates at 42 kHz and 50 watts.

The ink(s) are deposited at a temperature that is typically in the range of 25° C. (room temperature) to 280° C. (i.e., the inks are not heated, but temperature rises in build chamber 106 during the course of the build, as previously discussed). The ink is typically deposited to a height that is in a range from 50 microns to 500 microns. The ink is deposited at a rate that is usually within a range of 0.1 milli-liter (mL) per sec to 50 mL/sec. In an exemplary embodiment, ink is deposited to a height of 100 microns at 10 mL/sec.

3D printer 100 includes laser 118, maser 120, and a conventional microwave generator 124. Not all of these heat sources are used in every embodiment. For example, in some embodiments, laser 118 is used in conjunction with maser 120; in some other embodiments, laser 118 is used in conjunction with microwave generator 124; in some other embodiments, maser 120 is used in conjunction with microwave generator 124; and in some embodiments, only microwave generator 124 is used. Focused heat sources 118 and 120 are mounted at a distance from nozzle 236 that is typically in a range of about 1 to 50 centimeters, although at the greater distances, the focused heat sources will typically supported independently of print head 116. In an exemplary embodiment, focused heat sources 118 and 120 are 3 centimeters away from nozzle 236.

Laser 118 functions as a "sintering" laser (in the SLS technique, laser is used to sinter powdered material, binding the material together to create a solid structure). Laser 118 can be, without limitation, a $CO_2$ laser, a CO laser, a YAG laser, an Nd:YAG laser, a holmium laser, an argon laser, a fiber laser, a laser diode, etc., operating in a range of about 10 watts to about 1 Kw. The thermoplastic resin used in the ink dictates the energy required to fuse the ink. The particle size and absorbance spectrum of the ink dictates the operational wavelength of the laser. Typically, inks having relatively smaller particles (of polymer) require shorter wavelengths.

In some embodiments, laser 118 is used for sintering the thermo-polymer and thermo-polymer/nano-filler inks. The laser rapidly heats the ink to sinter the powdered material and evaporate the solvent in the ink. In some other embodiments, maser 120 can be used to rapidly heat the thermo-polymer/nano-filler ink and evaporate solvent. The maser will typically operate at a power in a range of 1 watt to 1 kW and at a frequency that is usually within a range of 40 MHz to 40 GHz. Laser 118 and maser 120 typically heat the various layers to a temperature within a range of 150° C. to 390° C. (as a function of the material).

Furthermore, maser 120 or microwave generator 124 can be applied in an unfocused manner at a relatively lower power resulting in somewhat less of a temperature rise than for sintering. This lower power microwave radiation provides for bonding across deposited layers and surfaces and can be applied after a build is complete or periodically throughout the build. Maser 120 or microwave source 124 can also be applied at even lower power resulting in even less of temperature rise than for the bonding operation for the purpose of annealing the thermo-polymer to increase the crystallinity and strength of the object. For annealing, temperature is ramped-up slowly. Annealing ramp-up rates will typically fall within a range of 1° C./hr to 100° C./hr. In an exemplary embodiment, temperature is increased at about 10° C./hr and then held at the annealing temperature for a period of time (e.g., 6 hrs., etc.), and then slowly cooled (e.g., 5° C./hr).

In an exemplary embodiment based on inks discussed above, for PEEK and PEEK/CNT inks, laser 118 can be a Nd:YAG laser with a wavelength of 1.064 microns and a power of 70 watts. The laser heats either of the inks to 330° C. to sinter the PEEK particles and evaporate the solvent within about 5 seconds of deposition. For the CNT and PEEK/CNT inks, and maser 118 operates at 120 W and 10 GHz. Maser 118 can be used to heat the PEEK/CNT ink to 330° C. to sinter the PEEK particles and rapidly evaporate the solvent. For PEEK/CNT ink, to bond across layers, the maser can be operated at 30 watts to reach a temperature of about 280° C. For annealing, the maser can be operated at 10 watts to reach a temperature of about 200° C.

Figure 3C:
FIG. 3C depicts a third layer structure, printed by the 3D printer of FIG. 1, for printing nano-filler/polymer composite parts in accordance with an embodiment of the invention.

With reference to the embodiments depicted in FIGS. 3A and 3C, nano-filler ink 342 interposes successive layers of thermo-plastic ink 340 and thermo-plastic/nano-filler ink 344. Taking the embodiment of FIG. 3A, for example, first layer of thermo-plastic ink is deposited and then sintered by laser 118 or maser 120. There is a maximum time, typically in a range of about 0.1 to about 360 seconds, from when the ink is deposited to when the focused heat source 118 or 120 must sinter the material. The timing is dependent on the viscosity and other rheological properties of the inks. The time it takes to sinter/melt the material will typically be in a range of between about 0.1 to about 120 seconds.

After a polymer layer is deposited, a second layer of nano-filler ink 342 is deposited. Although there is no polymer in the nano-filler layer (such that sintering/fusing is not required), laser 118 or maser 120 can optionally be applied to nano-filler layers (at low power) to accelerate the evaporation of solvent (i.e., the suspension medium) from the layer.

Following the nano-filler layer, a third layer of thermo-polymer ink 340 is deposited and sintered. This fuses the first three layers together. In some other embodiments, microwave radiation, via maser 118 or microwave source 124 is used to selectively heat nanofiller layer 342, thus heating and fusing the neighboring thermo-polymer surfaces together. This creates an inner core of directional nano-filler.

The use of microwave radiation may result in faster fusing times compared to using the sintering laser (on the polymer layers) alone. This method may also enhance layer-to-layer adhesion thereby increasing the z-axis properties, including mechanical strength and electrical/thermal conductivity. The is embodiment can be used with or without the additional use of a sintering laser (to sinter the polymer layers).

Then a fourth layer of nano-filler ink is deposited (with optional heating), followed by a fifth layer of thermo-polymer ink, focused heat application to sinter and fuse, and, optionally, broad application of relatively lower power microwave radiation. This fuses the $4^{th}$ and $5^{th}$ layer to the $3^{rd}$ layer, and so forth. The thermo-polymer layers provide rigidity to the nano-filler layer sandwiched therebetween and help form the geometrical shape of the object being printed.

The embodiment depicted in FIG. 3C proceeds in the same fashion as describe above, with thermo-plastic/nano-filler ink 344 replacing thermo-plastic ink 340.

In the embodiment depicted in FIG. 3B, there is no intervening layer 342 of nano-filler ink. In this embodiment, each layer is itself a composite (of the polymer and nano-filler). As in the previous embodiment, the laser heat source sinters the deposited ink shortly after it is deposited. Maser 120 is not used.

It is to be understood that although the disclosure teaches many examples of embodiments in accordance with the present teachings, many additional variations of the invention can easily be devised by those skilled in the art after reading this disclosure. As a consequence, the scope of the present invention is to be determined by the following claims.

What is claimed:

1. A method for printing an object via additive manufacturing, the process comprising:
   depositing a first layer, the first layer comprising droplets of a thermo-polymer ink, wherein the thermo-polymer ink comprises thermo-plastic resin particles ultrasonically dispersed in a first suspension medium;
   depositing, a second layer on at least a portion of the first layer, wherein the second layer comprises droplets of a nano-filler ink, wherein the nano-filler ink comprises a first nano-filler ultrasonically dispersed in a second suspension medium;
   depositing a third layer on at least a portion of the second layer, wherein the third layer comprises droplets of the thermo-polymer ink comprising thermo-plastic resin particles ultrasonically dispersed in the first suspension medium; and
   exposing the first, second and third layers to microwave radiation.

2. The method of claim 1 and further wherein the thermo-polymer ink further comprises second nanofiller.

3. The method of claim 2 wherein the first nano-filler and the second nano-filler comprise different materials.

4. The method of claim 1 wherein the first nano-filler comprises carbon nanotubes.

5. The method of claim 1 and further wherein prior to exposing the first, second, and third layers to microwave radiation, the method further comprises sintering the first layer by exposing it to laser light.

6. The method of claim 1 wherein exposing the first, second and third layers to microwave radiation further comprises exposing the first, second and third layers to microwave radiation at a first power level then exposing the first, second and third layers to microwave radiation at a second power level, wherein the first power level is relatively greater than the second power level.

7. The method of claim 6 further comprising exposing the first, second and third layers to microwave radiation at a third power level after exposing same at the second power level, wherein the second power level is relatively greater than the third power level.

8. A method for printing an object via additive manufacturing, the process comprising:
- depositing a first layer, the first layer comprising droplets of a thermo-polymer ink, wherein the thermo-polymer ink comprises thermo-plastic resin particles in a first suspension medium;
- depositing a second layer on at least a portion of the first layer, wherein the second layer comprises droplets of a nano-filler ink, wherein the nano-filler ink comprises a first nano-filler in a second suspension medium;
- depositing a third layer on at least a portion of the second layer, wherein the third layer comprises droplets of the first thermo-polymer ink; and
- exposing the first, second and third layers to microwave radiation, wherein the thermopolymer ink is prepared by:
  - (a) compounding the thermo-plastic resin particles with carbon black;
  - (b) powderizing the compounded thermo-plastic resin particles/carbon black to produce a powder;
  - (c) adding the powder to the first suspension medium forming a mixture; and
  - (d) agitating the mixture.

9. The method of claim 8 wherein the thermo-plastic resin particles is PEEK.

10. A method for printing an object via additive manufacturing, the process comprising:
- depositing a first layer, the first layer comprising droplets of a thermo-polymer ink, wherein the thermo-polymer ink comprises thermo-plastic resin particles in a first suspension medium;
- depositing a second layer on at least a portion of the first layer, wherein the second layer comprises droplets of a nano-filler ink, wherein the nano-filler ink comprises a first nano-filler in a second suspension medium;
- depositing a third layer on at least a portion of the second layer, wherein the third layer comprises droplets of the first thermo-polymer ink; and
- exposing the first, second and third layers to microwave radiation, wherein the thermopolymer ink is prepared by:
  - (a) compounding the thermo-plastic resin particles with a second nano-filler;
  - (b) powderizing the compounded thermo-plastic resin particles/second nano-filler to produce a powder;
  - (c) adding the powder to the first suspension medium, thereby forming a mixture; and
  - (d) agitating the mixture.

11. The method of claim 10 wherein the thermo-plastic resin is PEEK and the second nano-filler comprises CNTs.

12. A method for printing an object via additive manufacturing, the process comprising:
- depositing a first layer, the first layer comprising droplets of a thermo-polymer ink, wherein the thermo-polymer ink comprises thermo-plastic resin particles in a first suspension medium;
- depositing a second layer on at least a portion of the first layer, wherein the second layer comprises droplets of a nano-filler ink, wherein the nano-filler ink comprises a first nano-filler in a second suspension medium;
- depositing a third layer on at least a portion of the second layer, wherein the third layer comprises droplets of the first thermo-polymer ink; and
- exposing the first, second and third layers to microwave radiation, wherein the nano-filler ink is prepared by:
  - (a) adding the first nano-filler to the second suspension medium;
  - (b) adding a surfactant to the second suspension medium, wherein the surfactant, the first nanofiller, and the second suspension medium form a mixture; and
  - (c) agitating the mixture.

13. The method of claim 5 wherein the thermo-polymer ink further comprises particles adapted to enhance the absorption of radiant energy by the first layer.

* * * * *